United States Patent [19]

Sobotta

[11] 3,888,462

[45] June 10, 1975

[54] PHOTOGRAPHIC PROJECTOR WITH FADER DEVICE

[75] Inventor: Reinhard Sobotta, Mascherode, Germany

[73] Assignee: Rollei-Werke Franke & Heidecke, Braunschweig, Germany

[22] Filed: Oct. 24, 1973

[21] Appl. No.: 409,302

[30] Foreign Application Priority Data

Oct. 31, 1973 Germany .......... 2253267

[52] U.S. Cl. .......... 353/29; 353/83; 353/93

[51] Int. Cl. .......... G03h 21/26; G03h 23/16

[58] Field of Search .......... 353/83, 86, 90, 93, 29

[56] References Cited

UNITED STATES PATENTS

| | | | |
|---|---|---|---|
| 887,839 | 5/1908 | Patterson | 353/90 |
| 1,503,488 | 8/1924 | Crauer | 353/29 |
| 2,275,270 | 3/1942 | Rackett | 353/29 |
| 3,161,109 | 12/1964 | Carrillo | 353/86 |
| 3,358,558 | 12/1967 | Bradley | 353/90 |

*Primary Examiner*—Richard E. Aegerter
*Assistant Examiner*—A. J. Mirabito
*Attorney, Agent, or Firm*—Stonebraker, Shepard and Stephens

[57] ABSTRACT

A projector for projecting two parallel beams of light onto the same screen. The main beam projects the images of successive picture slides successively put into and withdrawn from the main optical axis. The second or auxiliary beam of light, colored if desired, contains no picture slide. A fade-in and fade-out arrangement serves to fade out the image of the picture slide and simultaneously to fade in the light from the auxiliary beam, so as to keep an approximately uniform brightness on the picture screen, and vice versa. While the slide image remains faded out, the slide changer operates to remove from the main optical axis the slide which has just been projected and to insert a fresh slide in the main optical axis. Then the auxiliary light beam fades out and the image of the fresh slide fades in. Three arrangements for obtaining the fading are disclosed: by changing the apertures of adjustable diaphragms in the respective beams; by moving an opaque shutter slide transversely of the beams; and by rheostat control of separate light bulbs for the two beams.

9 Claims, 5 Drawing Figures

1
2
3
4
5
6
7
8
9
10
11
14
15
16
20
21
28

20
3
28

20
7
26
27

PHOTOGRAPHIC PROJECTOR WITH FADER DEVICE

BACKGROUND OF THE INVENTION

Many slide projectors have provision for fading the picture from the viewing screen when a slide is to be changed, leaving the screen dark for a few seconds while the previously projected slide is moved from the optical axis back into the slide magazine and a fresh slide is moved from the magazine to the optical axis, then fading the new picture onto the screen again. In other projectors there is an abrupt darkening of the screen before the slide is changed, and then an abrupt appearance of a fresh picture on the screen when the slide change has been completed. In either case, there is an interval during the operation of the slide changer when the screen is completely dark. Many people find this objectionable.

To eliminate this interval of darkness, it has been proposed to use a fade in and fade out device whereby one picture dissolves or fades out on the screen while the fresh picture fades in. This, however, requires two separate projectors plus a control unit for controlling both of them in synchronism, to produce the fade out of the projected light beam from one projector simultaneously with the fade in of the light beam of the other projector. The necessity of using two separate projectors plus the control unit, makes this arrangement very expensive. Also, there are three separate units which must be placed one above another or in side by side relation, thus requiring much more space than a single projector. As a result, such fader arrangements are profitable only when used professionally, such as for lectures or for advertising.

An object of the present invention is to provide a simple, compact, and inexpensive projector with a fade in and fade out device having most of the advantages of the three unit professional equipment above mentioned, but without the disadvantages of large volume and high cost.

Another object is to provide, in a single projector of inexpensive and compact design, an arrangement for fading out a picture which has been projected, fading in a fresh picture, and keeping the screen illuminated during the slide changing interval between successive pictures so that there is an approximately uniform brightness of the projection screen without any dark interval between successive slides.

DESCRIPTION OF THE PREFERRED EMBODIMENTS

Figure 1:
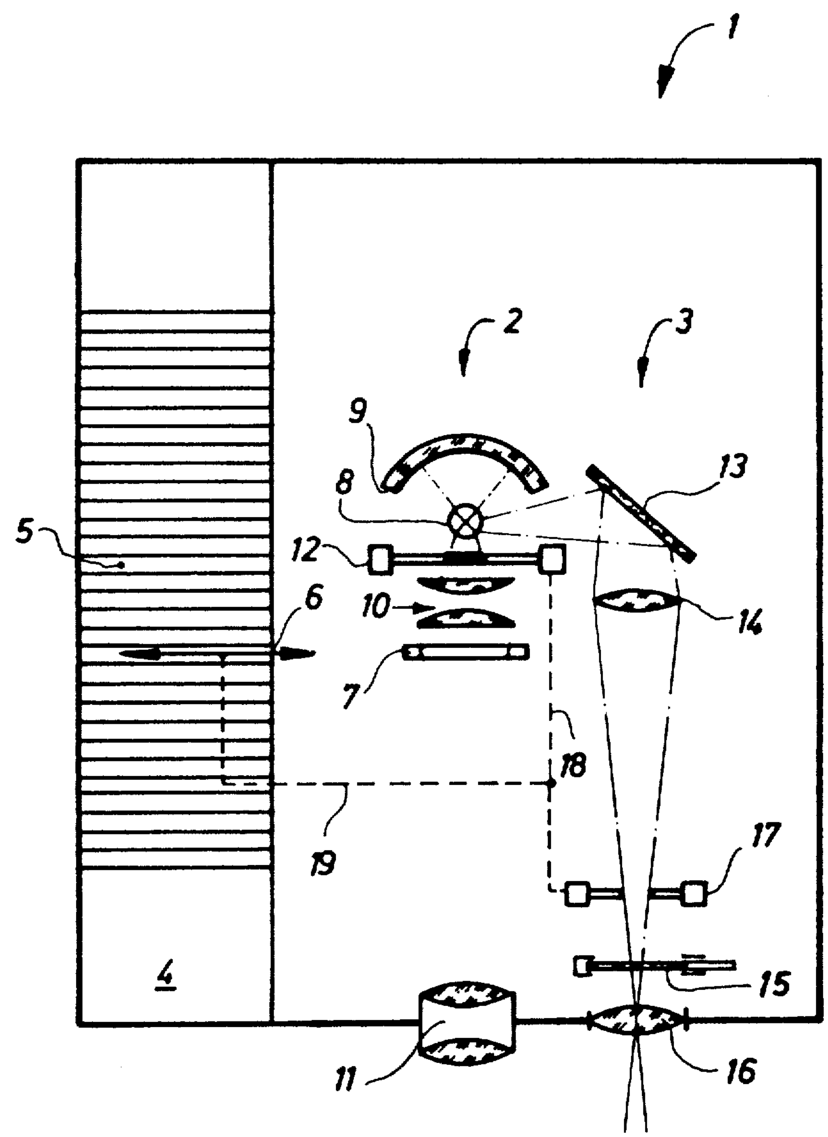
FIG. 1 is a schematic horizontal section through a projector in accordance with one embodiment of the invention.

According to the present invention, a single projector casing or housing is provided with means for projecting two light beams in a direction parallel or approximately parallel to each other, so that both beams fall on the same viewing screen. One projected beam, which may be referred to as the main beam or normal beam, is the light beam into which successive slides are successively moved, one at a time, for projection. The other beam, which may be called the supplementary or auxiliary beam, has no provision for receiving a slide, and serves to project light onto the viewing screen during the intervals while the main beam is obscured for purposes of changing the slides. The auxiliary beam may project white light, or there may be a colored filter in this beam, so that colored or tinted light falls on the screen.

According to one feature of the invention, fade in and fade out devices are associated with the two light beams and are coupled to each other in such a way that one beam fades in as the other fades out, and vice versa, so as to maintain approximately uniform brightness on the projection screen. This is very restful and easy on the eyes of the observers, in comparison to an arrangement where the viewing screen is dark for a few seconds while one slide is being withdrawn and another slide is being inserted in the optical axis of the main projection beam.

By incorporating the two beam projecting mechanisms in a single housing or casing, there is a great saving in space as compared with using two separate projectors, and of course a great saving in expense also. With respect to compactness, the optical axes of the two beams can be brought quite close to each other, especially as the supplemental or auxiliary beam does not require any associated mechanism for inserting slides into this beam.

In order to achieve the simplest fading, the fade in and fade out devices may be formed by adjustable aperture diaphragms (e.g., iris diaphragms) arranged in the main and auxiliary light beams, the two diaphragms being mechanically or electrically coupled with one another in opposite directions, and working jointly with the slide change mechanism, through mechanical or electrical connecting elements. During the first phase of the slide changer operation, the diaphragm of the main light beam, arranged ahead of the condenser for the main beam, is for example closed progressively to the same extent that the diaphragm of the auxiliary light beam is opened. Only when the diaphragm of the auxiliary beam is completely open, the picture slide in the main light beam is removed from the main light beam. This may be done when the diaphragm in the main light beam is still partly open to a slight extent, in which case the viewer perceives only a slight movement of the slide on the projection screen, since the slide is only dimly illuminated at this time, and the main illumination on the screen comes from the auxiliary light beam.

In a further and preferred development of the invention, the two diaphragms are coupled to each other and to the slide changer (either mechanically or electrically) in such a way that the slide changer does not begin to operate until the diaphragm of the main beam is completely closed and the diaphragm of the auxiliary beam is completely open. In this preferred arrangement, the viewer does not see any movement of the slide whatever on the screen, nor any shifting of a contour.

In a simplified version of the invention which is electro-mechanically less delicate, the fade in and fade out device is formed by a cover lug or shutter member which is so wide that it covers the picture slide area of one light beam and also the area between the two light beams, this cover lug or shutter being laterally slidable either in advance of or simultaneously with the actuation of the slide changer. This especially designed cover lug replaces, in practice, the conventional concealing shutter of a conventional projector of what may be called the concealed slide change type, where the light beam is cut off by the shutter slide just before the slide changer operates, and illumination is restored after the slide change has been completed. When this special cover lug of the present invention is laterally shifted, the auxiliary light beam is covered in one direction (say from left to right) in the same proportion that the main light beam is exposed by the other edge of the special cover lug.

In another embodiment of the invention, the fade in and fade out mechanism can, either in conjunction with the arrangements above described or independently thereof, be formed by two separate projection lamps controlled by a potentiometer and so arranged that one lamp, furnishing the illumination for one light beam, dims down to extinction or nearly to the extinction point while the other lamp, furnishing light for the other beam, brightens up to full illumination, and vice versa. Preferably the lamp of the main beam is dimmed down and the lamp of the auxiliary beam is brightened up, before the operation of the slide changer, and they remain in this condition during the slide change, then when the change operation is completed, the auxiliary lamp is dimmed down and the main lamp brightens up to maximum illumination, by operation of the potentiometer. This arrangement has the advantage that the two light beams need no additional mechanical fade in and fade out devices. The potentiometer, which may be of a commercially available kind, needs only to be operatively connected with the slide changer mechanism, mechanically or preferably electrically.

Furthermore, in any of the embodiments above mentioned, an interchangeable color filter can be provided in the auxiliary light beam, placed preferably between the light source and the auxiliary projection lens. The advantage of having a color filter for the auxiliary beam is that, when the auxiliary beam shines on the screen and the main beam is cut off during a slide change, the illuminated screen does not appear merely as a white or gray area, but as a colored or tinted area, according to the color of the filter which is used. By making the filter readily interchangeable, the person in charge of the projection can from time to time substitute one color filter for another, using whatever color is most appropriate to the predominant color of the slides being projected.

Reference is now made to FIG. 1, which shows schematically or diagrammatically one of the forms of the projectors described in general terms above. The projector is indicated in general at 1, and has a main projector mechanism indicated in general at 2, and an auxiliary or supplementary beam projector indicated in general at 3. Associated with the main projector 2 is a conventional slide magazine guide or trough 4 containing a conventional slide magazine 5 which is advanced step by step to bring successive slides into position where they can be transferred, by the conventional slide changer indicated schematically at 6, to a projection gate in the optical axis of the main projector 2. A picture slide at this projection gate or projection position is indicated at 7.

The main projector, or mechanism for projecting the main light beam, further includes the conventional projection lamp 8, and a reflector 9 behind it (conveniently of the conventional parabolic shape) together with a main condenser lens assembly 10 and a projection lens assembly 11, both of these lenses being conventional. A fade in and fade out device is in the form of a diaphragm 12 having an adjustable aperture, variable from full aperture to substantially zero or extinction aperture. This diaphragm is preferably located between the main lamp 8 and the main condenser 10.

The supplemental or auxiliary light beam projector 3, in the form here shown, receives light laterally from the main lamp 8, this light being reflected by the mirror 10 and then passing forwardly through the auxiliary condenser 14 and the auxiliary projection lens 16. These auxiliary lenses 14 and 16 do not have to be of high quality or high optical performance, as they do not serve to project a picture image onto the viewing screen, but only to project a beam of light to keep the viewing screen reasonably well illuminated while the main beam is cut off. An interchangeable color filter or color foil 15 of any conventional kind is placed in a conventional holder, preferably just before the auxiliary projection lens 16. A diaphragm having an adjustable aperture, similar to the previously mentioned diaphragm 12, is indicated at 17, in a suitable location between the supplementary condenser lens 14 and the supplementary projection lens 16. The diaphragms 12 and 17 are of any suitable form known per se, so the details need not be illustrated.

As already explained above, the two diaphragms 12 and 17 are connected to each other by an operating connection indicated schematically at 18, of such form that one diaphragm opens as the other closes. They are also connected, by a connection indicated schematically at 19, to the slide changer mechanism 6. The operating connections 18 and 19 may be either electrical or mechanical, of any suitable known form, the details not being illustrated.

These connections 18 and 19 are so formed that, at the beginning of operation of the slide changer 6, the diaphragm 12 is closed down and simultaneously the diaphragm 17 is opened up, before any movement of the picture slide takes place. Thus the viewing screen (not shown) ceases to be illuminated by the image of the picture slide which is in the main optical axis, and is illuminated instead by the auxiliary beam of light, to approximately the same brilliance as it had when the picture image was projected on the screen. Then, when this closing down of the diaphragm 12 and opening up of the diaphragm 17 is completed, the slide changer mechanism 6 operates in the normal way to remove from the optical axis the slide which has been projected, to advance the magazine 5 one step or increment, and to move the next slide from the magazine into the projection position 7. Then and only then, the operating connections operate to open up the diaphragm 12 and simultaneously close down the diaphragm 17, so that the image of the new picture slide now appears on the viewing screen, and the auxiliary light beam is darkened. The audience watching the screen sees simply a gradual fade out of the first picture image, while the over-all or general brightness of the screen area remains approximately constant, and then a gradual fade in of the new picture image. The audience is not distracted or disturbed either by seeing a movement of the picture image on the screen, or by having the screen completely darkened during the slide changer operation.

As above stated, the connections 18 and 19 may be either mechanical or electrical. Electrical connections are preferred, and when the purposes and general nature of the present invention are understood as a result of the present disclosure, the exact details of the electrical connections can easily be supplied within the skill of the art. For example, at the beginning of the movement of the slide changer (but before any actual movement of the picture slide itself takes place) an electric switch is closed, which initiates the closing down movement of the diaphragm 12 and opening movement of diaphragm 17. At the end of the movement of slide changer, after the fresh slide has been properly positioned in the optical axis of the main beam, another switch is operated to initiate the closing down of the auxiliary diaphragm 17 and the opening of the main diaphragm 12.

The audience viewing the screen gets the impression that on the colored screen which was visible during the slide changing operation, a picture image comes up, becoming clearer and clearer. At the same time, the overall or background color of the screen decreases in the same proportion that the contrast of the new picture image becomes increasingly visible on the screen.

Figure 2:
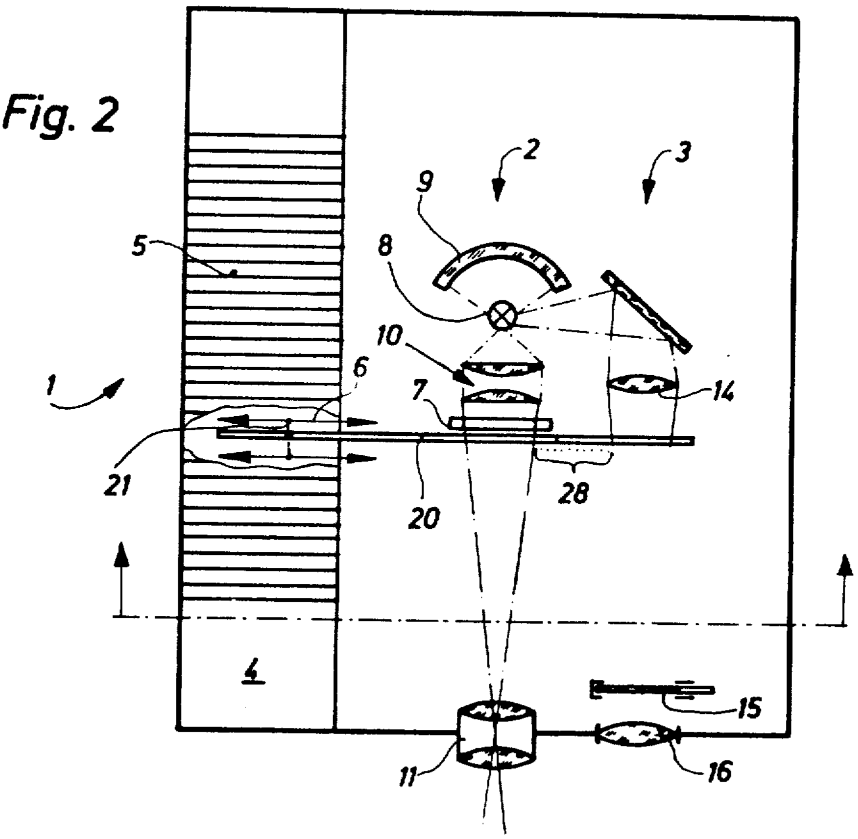
FIG. 2 is a similar view showing another embodiment of the invention.

In FIG. 2 there is illustrated another embodiment in which, as already described in general terms above, the adjustable diaphragms are replaced by a cover lug or movable shutter. The construction may be essentially the same as that previously described in connection with FIG. 1, except for the omission of the adjustable diaphragms 12 and 17, and the addition of the transversely movable shutter or cover lug 20. The shutter member 20 is operatively connected to the slide changer 6 by any suitable driving connection indicated schematically at 21.

Figure 2A:
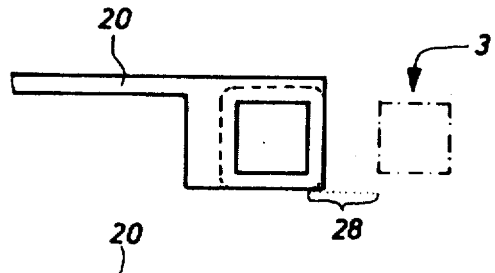
FIG. 2*a* is a front elevational view of a portion of the projector shown in FIG. 2, with parts broken away, showing a cover lug or shutter member in one position.

The shutter member or cover member 20 has, at one end, a rectangular opaque flange or lug area which, in one limit or extreme position such as shown in FIG. 2*a*, completely intercepts the main projection beam but does not interfere with the supplementary beam coming from the auxiliary projector parts 3. In the other limit or extreme position, shown in FIG. 2*b*, the opaque flap intercepts and completely obstructs the auxiliary beam of light, and does not affect the main beam. The length of the opaque lug or flap, in a lateral direction, is so proportioned relative to the spacing of the two beams from each other, that as the edge 26 of the lug begins to cover the main beam, the edge 27 of the lug begins to uncover the auxiliary beam, and vice versa. The area 28 between the two projected beams is traversed by the leading edge of the lug before the trailing edge begins to uncover its beam.

Figure 2B:
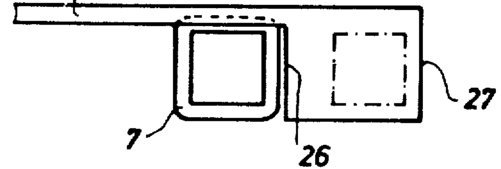
FIG. 2*b* is a similar view showing the cover lug in a different position.

Assuming that there is a picture slide 7 being projected by the main beam, the parts will be in the position shown in FIG. 2*b*. If now it is desired to change the slide, the slide changer 6 is moved to the left. When the left or leading edge 26 of the opaque shutter reaches the right margin of the main projection beam which is projecting the image of the picture slide onto the viewing screen, the right or trailing edge 27 reaches the right edge of the auxiliary beam. Further leftward movement of the shutter 20 gradually covers the main beam, progressively from right to left, and gradually uncovers the auxiliary beam, progressively from right to left so that as the picture image disappears from the screen in a progressive lateral or transverse manner, the beam of colored light projected from the auxiliary projection portion gradually appears in the same direction, transversely across the screen. For the viewer or person in the audience, a contour-like blurred area appears on the projection screen, which moves from left to right across the screen and separates the projected slide image slowly disappearing from a progressively increasing colored surface of approximately the same brightness. When the cover lug or shutter member 20 has been moved completely to the left to the position shown in FIG. 2*a*, then only the auxiliary projection beam of colored light falls on the viewing screen, and the projected image of the picture slide 7 is completely obliterated. This occurs preferably before any movement of the picture slide itself takes place. Then, upon continued movement of the mechanism, while the lug or shutter member 20 remains stationary in the position shown in FIG. 2*a*, the picture slide is moved leftwardly (viewed as in FIG. 2) out of the projection gate into the magazine 5, the magazine is stepped or indexed through one increment, and the next picture slide is moved from the magazine into projection position. Then the lug or shutter 20 is moved rightwardly, and the visual result to the observer is the reverse of what has been described above. Gradually the plain colored area of the screen decreases in a lateral or transverse direction, and the image of the picture slide begins to appear at the right edge of the projection screen and spreads laterally across the screen until the full width of the projected picture is visible.

This fade in and fade out device has the advantage that the electrical or mechanical demands on this device are of a limited nature. The somewhat expensive main and auxiliary diaphragms 12 and 17, used in the first embodiment above described in connection with FIG. 1, and the connecting or coupling elements 18 between the diaphragms are eliminated in this construction shown in FIG. 2.

Figure 3:
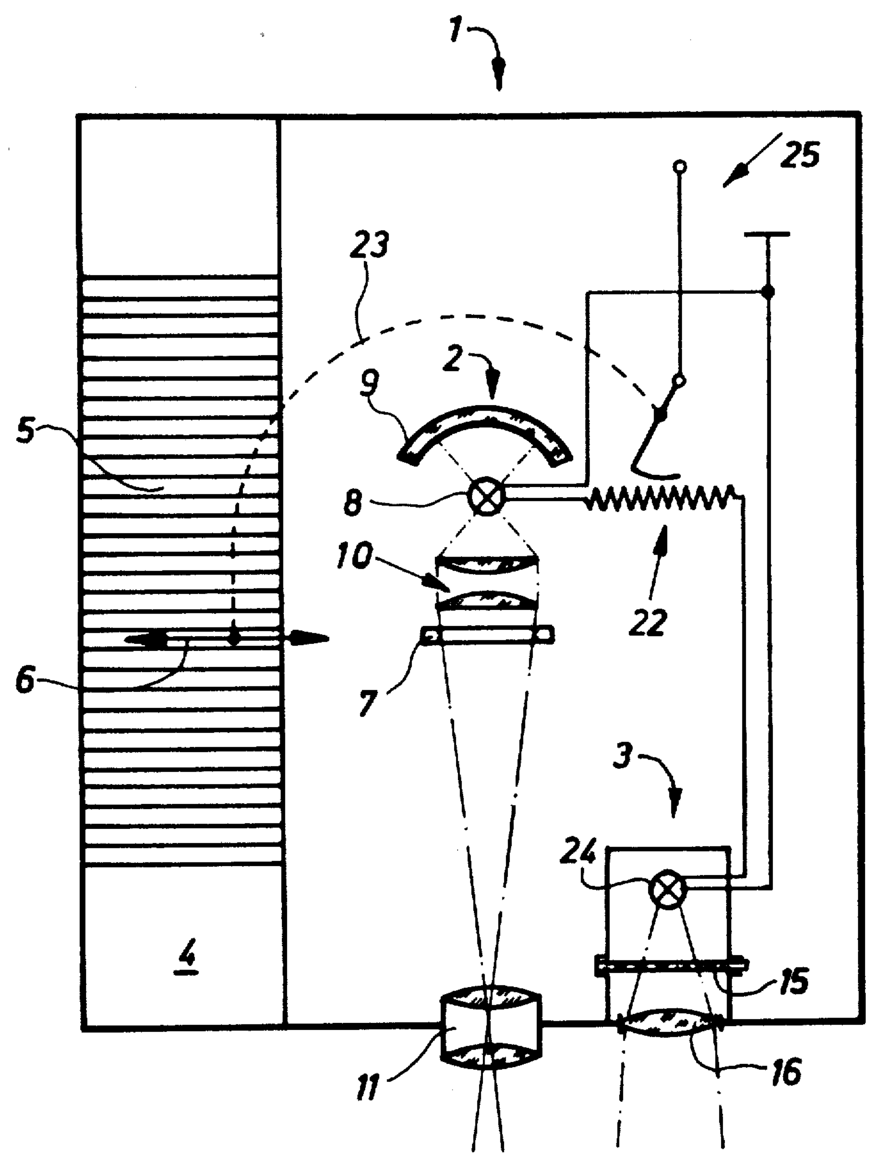
FIG. 3 is a view similar to FIGS. 1 and 2, showing a third embodiment of the invention.

A third embodiment, involving the brightening and dimming of separate light bulbs, as already described above in general terms, is illustrated schematically in FIG. 3. The parts for producing the main projection beam are essentially the same as in FIG. 1, and are designated by the same reference numerals. The auxiliary light beam projection mechanism 3 has an auxiliary lamp 24, and there is a color filter 15 between the lamp 24 and the auxiliary projection lens 16.

The two lamps or bulbs 8 and 24 can be independently adjusted by the potentiometer indicated schematically at 22, coupled to the slide changing device 6 by the coupling (either mechanical or electrical) indicated schematically at 23. The power supply indicated in general at 25 provides power for both the main lamp 8 and the auxiliary lamp 24, in any suitable circuit arrangement, the only requirement being that the brightness of the two bulbs is inversely controlled by the potentiometer 22. That is, as one bulb dims down, the other brightens, and vice versa.

In this embodiment, the operation of the fade in and fade out device is purely electrical, except for possibly a mechanical connection 23 between the slide changer 6 and the movable operating member of the potentiometer 22. If a slide is in projection position at 7, and it is desired to change the slide, the potentiometer is operated to dim the bulb 8 and at the same time to brighten the bulb 24, which was dark or almost dark while the picture image was being projected along the main projection axis. The brightening of the bulb 24 and dimming of the bulb 8 continues until the bulb 24 is at maximum brightness and the bulb 8 is substantially completely extinguished. For the viewer, this means the same fade out operation as with the first embodiment described in connection with FIG. 1. The picture image gradually disappears from the projection screen and is replaced by a general or non-picture illumination of the screen, colored if desired by the filter 15, to approximately the same general brightness as that which existed while the picture image was on the screen. Then the slide changer operates, to move the previously projected slide back into the magazine 5, to step or index the magazine through one space, and to move the next slide into projection position 7. Then the potentiometer operates to gradually dim down the lamp 24 and to gradually brighten the lamp 8, so that the image of the new picture slide gradually comes into view on the viewing screen and the over-all brightness from the auxiliary beam of light gradually disappears concomitantly with the increasing brightness of the image of the picture slide.

This embodiment of the invention as described in connection with FIG. 3 requires an additional lamp 24 as compared with the embodiment shown in FIG. 1, but has the advantage of less mechanical parts subject to wear. The sole mechanical part of consequence is the potentiometer 22, which is a standard article available at a reasonable price on the commercial market, and is scarcely subject to wear and tear.

The demands on these versions or embodiments according to the present invention, of fading from slide to slide without a blackout pause, are in general less than the demands of a direct fading operation from one picture to another, which requires special projectors and control mechanism as above mentioned.

Since the two light beams, main and auxiliary, are quite close to each other, being just a few inches apart, there is scarcely any parallax effect on a viewing screen at an average normal distance from the projector, and the screen area covered by the main projection beam is substantially the same as that covered by the auxiliary projection beam, for all practical purposes. If exact concurrence is desired, this can be accomplished by making the auxiliary projection lens 16 laterally adjustable to a slight extent, toward and away from the main projection axis, so it can be adjusted until the beam projected onto the screen by the auxiliary projection lens covers precisely the same area as that covered by the main beam of light projected by the main projection lens 11. But this theoretical nicety of adjustment for perfect concurrence of the two beams is wholly unnecessary from a practical standpoint, under average or normal conditions.

What is claimed is:

1. A picture slide projector comprising means for projecting a main beam of light onto a viewing screen, slide holding means for holding a selected one of several picture slides in said main beam in position so that an image of such slide may be projected along said main beam onto the viewing screen, means for hold a slide magazine containing several picture slides, slide changing means for moving successive slides from said magazine to said slide holding means in said main beam and vice versa, means for projecting a non-picture auxiliary beam of light onto the same viewing screen for screen illumination purposes only without producing any picture image thereon, and fading means for fading out one beam and fading in the other beam alternately, so that the image of the picture slide may be faded from the viewing screen in connection with a change of slides and while so faded out the screen may be illuminated to approximately the same brilliance by light from the auxiliary beam and without any picture during such illumination by the auxiliary beam, there being no slide holding means in said auxiliary beam and no slide changing means for moving a slide into and out of said auxiliary beam.

2. A projector as defined in claim 1, further comprising a single projector housing, the means for projecting both beams of light being located in the same housing.

3. A projector as defined in claim 1, wherein said fading means comprises two adjustable aperture diaphragms, one located in each light beam, and coupling means coupling the two diaphragms to each other for simultaneous movement in opposite directions so that as the aperture of one diaphragm is decreased, that of the other is increased, and vice versa.

4. A projector as defined in claim 3, further comprising means coupling said slide changing means to said diaphragms to cause the diaphragm in the main light beam to complete its closing down movement before the slide changing means moves a slide from projection position and to cause such diaphragm to start its opening up movement only after another slide has been fully placed in projection position.

5. A projector as defined in claim 1, wherein said fading means comprises a cover lug movable transversely with respect to both light beams and sufficiently wide to cover one light beam and the area between the two beams, said lug being so proportioned that as the lug begins to obscure one edge of one light beam during transverse movement of the lug, it simultaneously begins to uncover the corresponding edge of the other light beam.

6. A projector as defined in claim 1, wherein said fading means comprises two separate lamps for illuminating the two light beams, and means for dimming the two lamps alternately, so that as one lamp is dimmed, the other increases in light output, and vice versa.

7. A projector as defined in claim 6, wherein the means for dimming the two lamps includes a potentiometer operatively connected to and operating in synchronism with said slide changing means.

8. A projector as defined in claim 1, further comprising means for holding an interchangeable color filter in said auxiliary beam of light.

9. A projector as defined in claim 1, wherein each of said light beam projecting means includes a condenser lens and a projection lens, the condenser lens and the projection lens of the auxiliary beam being of lesser optical quality than those of the main beam.

* * * * *